United States Patent [19]
Bullinger et al.

[11] Patent Number: 6,031,484
[45] Date of Patent: *Feb. 29, 2000

[54] RELEASE DEVICE FOR PASSENGER RESTRAINT SYSTEMS IN A MOTOR VEHICLE

[75] Inventors: Wilfried Bullinger, Korntal-Muenchingen; Walter Eberle, Hochdorf; Markus Hartlieb, Walddorfhaeslach; Michael Meyer, Altdorf; Manfred Mueller, Deizisau; Frank Zerrweck, Stuttgart, all of Germany

[73] Assignee: DaimlerChrysler AG, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/974,671

[22] Filed: Nov. 19, 1997

[30] Foreign Application Priority Data

Nov. 19, 1996 [DE] Germany .............................. 196 47 660

[51] Int. Cl.$^7$ .................................................. G01S 13/93
[52] U.S. Cl. .............................. 342/72; 340/903; 340/436; 701/45
[58] Field of Search .................................. 342/70, 71, 72; 340/903, 435, 436; 701/301, 45, 46, 47

[56] References Cited

U.S. PATENT DOCUMENTS

| | | | |
|---|---|---|---|
| 3,684,309 | 8/1972 | Uchiyamada et al. ................. | 342/72 X |
| 4,104,632 | 8/1978 | Fujiki et al. .............................. | 342/71 |
| 5,285,207 | 2/1994 | Asbury et al. ........................... | 342/129 |
| 5,552,986 | 9/1996 | Omura et al. ....................... | 364/424.05 |
| 5,594,414 | 1/1997 | Namngani ................................ | 340/436 |
| 5,638,281 | 6/1997 | Wang ...................................... | 264/461 |

FOREIGN PATENT DOCUMENTS

| | | |
|---|---|---|
| 0 210 079 A2 | of 1986 | European Pat. Off. . |
| 0 727 336 A1 | of 1994 | European Pat. Off. . |
| 0 728 624 A2 | of 1996 | European Pat. Off. . |
| 22 24 842 | of 1972 | Germany . |
| 23 17 385 | of 1976 | Germany . |
| 22 56 146 | of 1980 | Germany . |
| 29 22 273 | of 1981 | Germany . |
| 35 07 381 A1 | of 1986 | Germany . |
| 36 37 165 A1 | of 1988 | Germany . |
| 41 17 811 A1 | of 1992 | Germany . |
| 42 20 270 A1 | of 1993 | Germany . |
| 43 08 776 A1 | of 1993 | Germany . |
| 43 24 753 A1 | of 1994 | Germany . |
| 44 26 090 A1 | of 1995 | Germany . |
| 195 24 358 C1 | of 1996 | Germany . |
| 196 10 833 A1 | of 1996 | Germany . |
| 44 24 878 A1 | of 1996 | Germany . |
| 44 29 419 A1 | of 1996 | Germany . |
| 48-9896 | 3/1973 | Japan . |
| 48-90331 | 10/1973 | Japan . |
| 60-31680 | 3/1985 | Japan . |
| 2-7154 | 1/1990 | Japan . |
| 7-253986 | 10/1995 | Japan . |
| 08-132997 | 5/1996 | Japan . |
| WO 86/05149 | of 1986 | WIPO . |
| WO 90/09298 | of 1990 | WIPO . |
| WO 94/14638 | of 1994 | WIPO . |

*Primary Examiner*—John B. Sotomayor
*Attorney, Agent, or Firm*—Evenson, McKeown, Edwards & Lenahan, P.L.L.C.

[57] ABSTRACT

The invention relates to a triggering control device for occupant restraint systems in a vehicle whose triggering readiness can be influenced as a function of collision-relevant parameters. According to the invention, collision parameter detection comprises object detection, which can detect a collision object before a collision occurs in an area near the vehicle, and can determine at least a relative speed. Whenever a collision object is detected, a signal generator delivers a collision parameter signal that depends on the relative speed determined. In a preferred embodiment the collision parameter detection unit also determines the intrinsic speed of the vehicle and whenever no collision object is detected, the signal generator supplies a collision parameter signal influenced by the intrinsic speed.

28 Claims, 2 Drawing Sheets

RELEASE DEVICE FOR PASSENGER RESTRAINT SYSTEMS IN A MOTOR VEHICLE

BACKGROUND OF THE INVENTION

This application claims the priority of German patent application no. 196 47 660.7, the disclosure of which is expressly incorporated by reference herein.

The invention relates to a triggering device for occupant restraint systems in a vehicle for protecting vehicle occupants in a collision.

A triggering device of this type, disclosed in German patent document DE 43 24 753 A1, comprises a triggering control device which triggers a side airbag when a triggering threshold is exceeded by a delay signal generated from the acceleration signal of a transverse acceleration sensor. Also, a deformation sensor located behind the outer skin in the side area of the vehicle detects the deformation rate of the outer skin during an impact. In the event of critical deformation, a control signal is delivered to lower the triggering threshold by an amount which increases directly with the determined deformation rate. Alternatively (or in addition), the triggering readiness can also be influenced by changing the generation of the delay signal as a function of the deformation rate.

This known triggering device permits a rapid and safe response of the triggering device in the event of a side impact which is dangerous to occupants, and at the same time provides security against improper triggering in collisions that are not too dangerous. The known triggering device can be considered disadvantageous, however, in situations when the extensive monitoring of one side of the vehicle by means of deformation sensors can be implemented only at great expense.

In addition, a number of devices are known in which the decision to trigger restraining devices is not based on the evaluation of an acceleration signal from an acceleration sensor. Rather an attempt is made, for example by means of proximity sensors, even before any impact, to detect relevant collision parameters (such as spacing and relative speed), in order to anticipate an unavoidable impact, and to activate corresponding safety equipment even before the collision. Because triggering takes place early, a restraint system such as an airbag has more time to deploy, permitting gentler impact protection for the occupants. This type of advance triggering is referred to as "pre-crash" triggering. The emphasis then is on the possibility of avoiding the impact even before an impending impact, initiating anti-collision strategies such as automatic emergency braking or avoidance maneuvers.

This general idea is implemented in detail in German patent document DE 36 37 165 A1. At least one transmitter that preferably emits electromagnetic signals in the direction of travel, and at least one receiver that picks up at least one echo signal reflected from the object, are used as a sensor system for locating a collision object. Relative speed with respect to the collision object can be determined directly from the Doppler frequency shift of a radar or infrared signal. For further details and more information on the prior art of pre-crash triggering with the radar method and the radar-Doppler method, reference is made to German patent documents DE 22 24 842 A1, DE 44 24 878 A1, and DE 44 26 090 A1; International patent document WO 86/05149; European patent document 210 079 A2; and U.S. Pat. Nos. 4,104,682 and 3,684,309.

Radar-Doppler methods are also suitable for road condition detection. In a method disclosed for example in German patent document DE 44 29 419 A1, the power density spectrum of the ground echo from a radar-Doppler system is evaluated.

German patent document DE 36 37 165 A1, mentioned above, teaches the use of video camera systems with image evaluation, instead of radar or infrared sensors. By image processing, the distance, rate of approach, size, and shape of an approaching object are determined, compared with stored data or samples, and the degree of danger is evaluated. If a predetermined danger threshold is exceeded, an airbag is triggered. Further technical details for a system for monitoring the vehicle-external state using video cameras also follow from German patent document DE 43 08 776 A1.

Pre-crash triggering systems are known in which, in the near area between two vehicles on a collision course, collision-relevant data such as weight, speed, and direction are exchanged over a wireless communication space.

Known pre-crash triggering devices include object detection arrangements that make it possible reliably to detect an oncoming vehicle and determine its relative speed. The degree of danger of an imminent collision however also depends critically on the weight of the object with which the collision will occur. At least with the less expensive method that uses radar or infrared signals to detect the collision object, this important information cannot be obtained and the triggering decision cannot be based on it. A large cardboard carton lying on the road could therefore be evaluated in the same way as a standing vehicle and elicit a corresponding but inappropriate reaction in this case.

In order for the known systems to offer the best possible protection in pre-crash triggering, even against collisions with objects at rest such as posts or trees, the latter must also be recognized by the object detection system. As far as sensing is concerned, this requires a sensitive and continuous design of the system which in turn increases the danger of improper triggering caused for example by a passing vehicle coming in the other direction at a short distance.

SUMMARY OF THE INVENTION

The object of the present invention is to provide a triggering device of the type described above which, at the lowest possible expense, can make a triggering decision as early as possible, while avoiding improper triggering to the greatest degree possible.

This and other objects and advantages are achieved by the triggering device according to the invention, which includes collision parameter detection that can detect a collision object in an area near the vehicle, even before a collision takes place, and can supply to the vehicle at least its relative speed, performing an evaluation. When a collision object has been detected, the collision parameter detection system delivers a collision parameter signal that depends on the relative speed to influence the triggering readiness. Advantageously, triggering readiness increases with increasing relative speed, especially when the triggering threshold decreases monotonically with increasing relative speed, at least in a lower speed range. (The characterization "decreases monotonically" includes the boundary cases in which the triggering threshold remains unchanged in certain areas.)

Alternatively (or in addition), the triggering readiness can be controlled by controlling the preparation of the delay signal, from the acceleration signal for example by varying an integration weight, such as is described in German patent document DE 43 24 753 A1 mentioned above. For the sake of simplicity, the triggering device according to the invention will be described herein primarily as an example of influencing the triggering threshold.

For object acquisition, for example, it is possible to use all of the systems mentioned at the outset in conjunction with pre-crash triggering to provide a relative speed determination. These include all kinds of range or Doppler measuring systems based on the evaluation of radar, infrared, or ultrasonic waves as well as the above-mentioned image-processing systems and near-range communication systems.

Depending on whether object detection in a sensing area is monitored in front of, behind, or at the side of the vehicle (as described for example in International patent document WO 86/05149), protection against head-on, rear, and side collisions can be provided by the triggering device according to the invention.

The advantages of the invention over the prior art reside in the fact that even before an impact, the triggering control device is prepared for an imminent collision, while at a high measured relative speed, rapid triggering is made possible for example by a low triggering threshold. In contrast to the deformation rate detected on the outer skin of the vehicle, which depends on many other factors and varies locally, the relative speed is a well-defined physical parameter associated with the collision object alone, which simplifies the tuning of the triggering device.

According to the invention, a delay signal derived from an acceleration signal must exceed the triggering threshold as a necessary criterion for the triggering decision. Thus, not only the relative speed but also the weight of the collision object is included in the triggering decision. In this way, a light collision object which because of its low weight poses no danger despite its high relative speed, can never cause triggering.

Another advantage is that by incorporating the relative speed into the triggering decision, an impact at low relative speed (and therefore a low degree of danger) is immediately evaluated correctly, for example by raising the triggering threshold to suppress triggering. This is especially important in head-on collisions, because the acceleration signal of a "hard" impact against a wall at low speed, during its initial portion, often differs little from the acceleration signal of a "soft" impact at a mean relative speed of approximately 55 kilometers per hour against a deformable barrier. Such an impact, in which the barrier is destroyed after the deformation zone is used up, must be evaluated differently because of its greater degree of risk for occupants.

In a preferred embodiment, the triggering threshold which is influenced by collision parameter detection is a triggering threshold for a delay signal which is generated from a signal representing the lengthwise acceleration of the vehicle, and the relative speed that can be determined from object detection represents a lengthwise relative speed (that is, the component of the relative speed in the lengthwise direction of the vehicle). Advantageously, the intrinsic vehicle speed is taken into account in controlling the triggering readiness. In a special design, whenever no collision object is detected, the triggering threshold, at least in a lower speed range, decreases monotonically with increasing intrinsic speed.

This design offers the considerable advantage that triggering readiness (especially the dependence of the triggering threshold on the intrinsic speed) can be selected so that, by contrast with collision objects at rest (in which the lengthwise relative speed is always equal to the intrinsic speed of the vehicle in the event of a collision), an optimum triggering behavior results. A collision against a resting collision object is therefore always correctly evaluated even when the collision object has not been picked up by object detection.

In turn this makes it possible to limit the design of object detection to the detection of objects in traffic that are not at rest such as motor vehicles and motorcycles, since collision objects that are at rest or are moving at a low speed are already correctly evaluated. In this way, sensing collision objects can be made less sensitive and spatially more concentrated. This reduces both engineering cost and the danger of improper triggering.

Other objects, advantages and novel features of the present invention will become apparent from the following detailed description of the invention when considered in conjunction with the accompanying drawings.

DETAILED DESCRIPTION OF THE DRAWINGS

Figure 1:
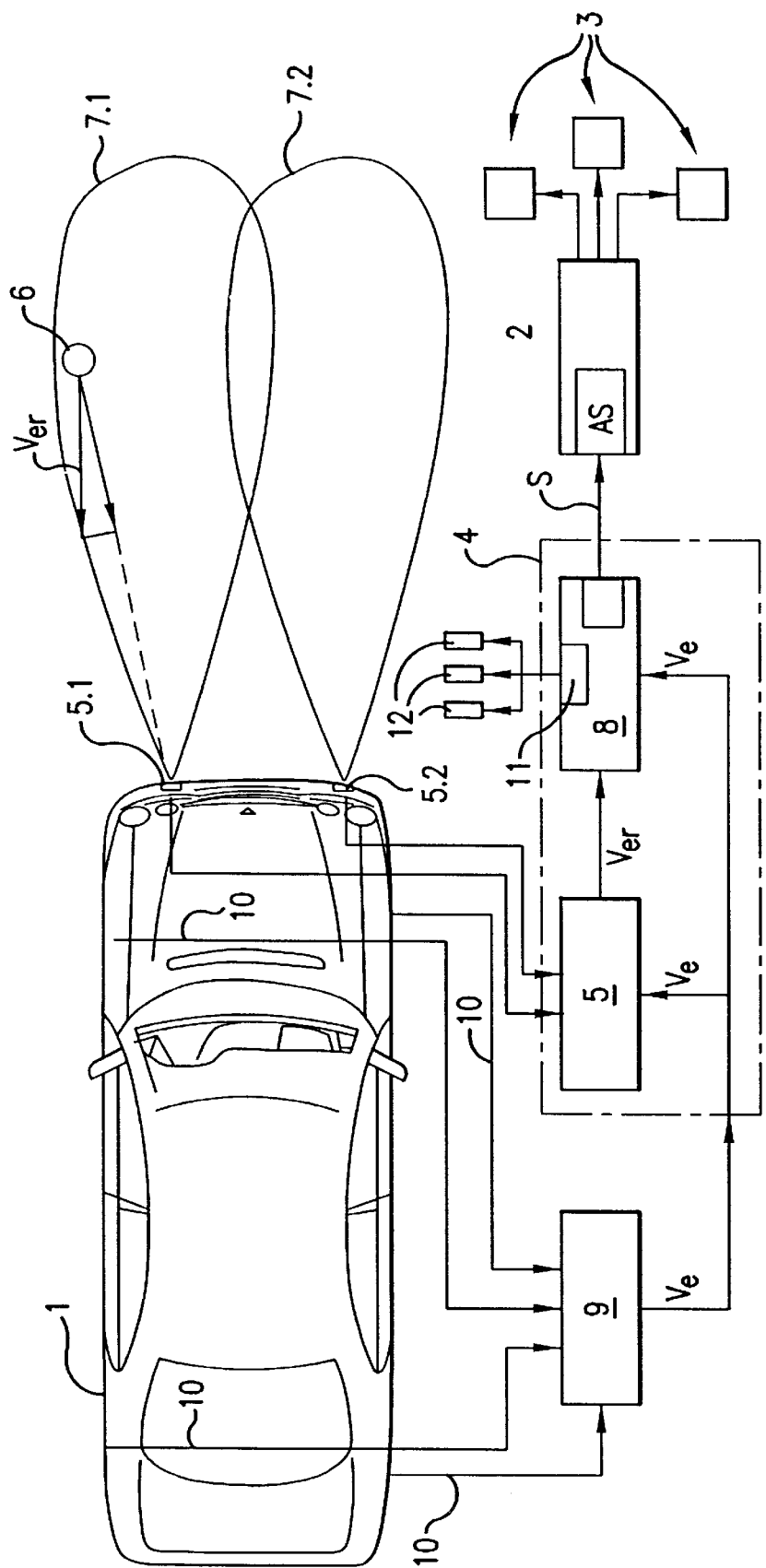
FIG. 1 shows an embodiment of the triggering device according to the invention.

FIG. 1 shows a top view of a vehicle 1 with the triggering device according to the invention, including a triggering control device 2 for occupant restraint system 3 (for example air bags or belt tighteners). In the embodiment shown, as an example, a collision parameter detection unit 4 controls a triggering threshold AS for a delay signal prepared from the acceleration signal of an acceleration sensor (not shown) that represents the lengthwise acceleration of the vehicle. If triggering threshold AS is exceeded, the triggering control device triggers at least one of the restraint systems 3 suitable for providing protection against head-on collisions (for example, a belt tightener or a front airbag).

According to the invention, the collision parameter detection unit 4 comprises an object detection arrangement 5, 5.1, 5.2, which, in a near area around vehicle 1, can detect a laterally offset post even before a collision and can determine the relative speed to the collision object 6. In the embodiment shown, the object detection arrangement 5, 5.1, 5.2 comprises Doppler radar measuring devices 5, 5.1, 5.2 (known per se), which detect a penetrating collision object in the sensing areas 7.1, 7.2 in front of the vehicle and can measure its relative speed. The first measuring device 5.1 includes a sensing area 7.1 in the form of a radar lobe that is narrowly aligned in the lengthwise direction of the vehicle, with the main direction of the lobe running parallel to the lengthwise axis of the vehicle on the driver's side of the vehicle. The second measuring device 5.2 detects a sensing area 7.2 in the form of a narrow radar lobe likewise aligned in the lengthwise direction of the vehicle, the main direction of said lobe extending parallel to the lengthwise axis of the vehicle but located on the passenger side of the vehicle. Measuring devices 5.1, 5.2 thus detect all the vehicles and objects at rest that penetrate without excessive lateral offset in the respective sensing areas 7.1, 7.2.

With the narrow radar lobe/lobes aligned in the lengthwise direction of the vehicle, a situation is created in which a relative speed $v_r$ measured from one or both of measuring devices 5.1, 5.2 simultaneously approaches the lengthwise relative speed $v_{lr}$ of a collision object 6. The lengthwise relative speed $v_{lr}$ is the most important parameter for controlling the triggering readiness of a triggering threshold related to the lengthwise acceleration of the vehicle. Even in the case of a diagonal impact with another vehicle, significance is given only to the components of the relative speed in the lengthwise direction of the vehicle. Suitable Doppler-radar measuring devices 5.1, 5.2 have a sensing range limitation of 1–2 meters and angular limitation of 20–50° horizontally, and approximately 40° vertically at −3 dB points.

A Doppler-radar measuring system based on microwaves in the GHz range for detecting the relative speed has the advantage that the measurement is influenced very little by the external shape of the colliding object, in contrast to measuring methods based on travel time measurement of an echo pulse. Another advantage is that the microwave signal is influenced to a lesser degree by fog, rain, snow, or dust than an infrared signal, which depends on the optical properties of the atmosphere to a great degree.

Collision parameter detection unit 4 also includes a signal generator 8, which is controlled by an object acquisition unit 5 upon detection of a collision object with a signal that corresponds with the determined lengthwise relative speed $v_{lr}$. Whenever a collision object is detected, signal generator 8 delivers to triggering control device 2 a delay collision parameter signal S dependent on the speed $v_{lr}$, that causes triggering threshold AS to decrease monotonically with increasing determined relative speed, at least in a lower range for the relative speed. Accordingly, the triggering readiness increases with increasing relative speed. The same effect is also achieved by influencing the preparation of the delay signal, as already mentioned.

Figure 2:
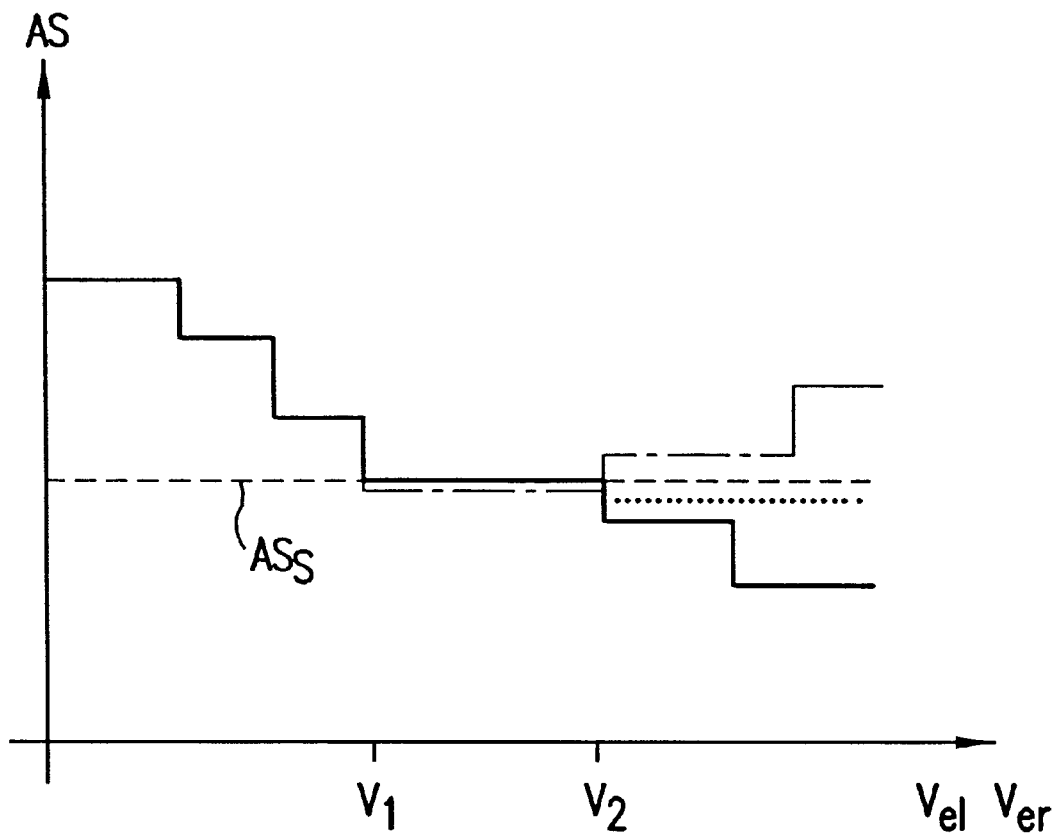
FIG. 2 is a graphic depiction of the operation of several embodiments for influencing the triggering threshold as a function of the determined relative speed $v_{lr}$ and the intrinsic speed $v_e$.

FIG. 2 shows as a solid line, a typical monotonically decreasing curve for varying triggering threshold AS as a function of the determined relative speed $v_{lr}$. The stepwise decreasing curve permits simple programming of the functional dependence, but it is not essential; with suitable additional expense a smooth characteristic curve can be produced without discontinuities. A standard triggering threshold $AS_s$ is plotted as the dashed line, which corresponds to the triggering threshold in known triggering devices. The standard triggering threshold in known triggering devices is chosen so that a) sufficient protection can be provided against improper triggering during standard driving even when traveling over rough places in the road, and b) an optimum triggering method is ensured at least at average collision speeds $v_k$. The standard driving includes all possible driving speeds while the average collision speeds $v_k$ lie in a range $v_1 < v_k < v_2$, which is limited for example by the speed values $v_1 = 30$ km/h and $v_2 = 60$ km/h and includes the conventional collision speeds in crash tests.

In an advantageous embodiment, the triggering threshold specified when a collision object is detected is raised relative to the standard triggering threshold if the determined lengthwise relative speed $v_{lr}$ is in a lower speed range, especially below speed value $v_1$, as the solid curve in FIG. 2 shows. In this way, triggering at low relative speeds is effectively reduced or suppressed.

Alternatively, or in addition, when a collision object is detected and the relative speed $v_{lr}$ lies in an upper speed range (especially above speed value $v_2$), the triggering threshold is lowered relative to the standard triggering threshold, as shown in FIG. 2. In this way, more rapid triggering can be achieved at high relative speeds.

This manner of controlling the triggering threshold by the collision parameter detection unit 4 shown in FIG. 2, assures that, even when a collision object is not detected as a result of a defect, the triggering behavior of the triggering device according to the invention will not be different from that of the known triggering devices that use the standard triggering threshold.

In an advantageous embodiment, the collision parameter detection unit 4 also takes into account the intrinsic speed $v_e$ of the vehicle. A corresponding signal can be supplied in many vehicles by the CAN-BUS. An intrinsic speed detector 9, like that already available in many vehicles in the ABS control device, determines the intrinsic vehicle speed $v_e$ for example from wheel rotational speeds 10, as indicated in FIG. 1. According to the invention, collision parameter detection unit 4 performed by signal generator 8 whenever no collision object is detected, delivers a collision parameter signal S which, at least in a lower speed range, cause the triggering threshold AS to decrease monotonically with increasing intrinsic speed $v_e$. Alternatively or in addition, the triggering readiness can be influenced by the preparation of the delay signal, as already mentioned.

In general, the dependence of the triggering threshold on the intrinsic vehicle speed must be chosen so that, relative to collision objects at rest (in which the lengthwise relative speed $v_{lr}$ in a collision is always equal to the intrinsic speed $v_e$ of the vehicle), an optimum triggering behavior is obtained. An impact against a collision object at rest is then always evaluated correctly, even when the collision object has not yet been picked up by object detection unit 5.

The variation of triggering threshold AS as a function of the intrinsic speed $v_e$ based on the standard triggering threshold $AS_s$, as represented by the dashed line in FIG. 2, advantageously takes place so that the triggering threshold AS is raised, if, with no collision object being detected, intrinsic speed $v_e$ lies in a lower speed range, especially below speed value $v_1$. In particular, in this lower range, the influence can be exerted in the same fashion as when a collision object is detected by the relative speed $v_{lr}$ determined, as shown in FIG. 2 by the solid line.

If the intrinsic speed $v_e$ is in a medium speed range (especially $v_1 < v_e < v_2$), and if a collision object has not been detected, the triggering threshold AS can be varied so that the value of the standard of threshold $AS_s$ (dashed line) is assumed. In an upper speed range (especially $v_e > v_2$), this value can be retained (dashed line) or lowered (dotted line). The limiting factor in lowering relative to the standard triggering threshold $AS_s$ at high vehicle speeds is protection against improper triggering.

Alternatively, in a middle speed range (especially $v_1 < v_e < v_2$), a value below the standard triggering threshold, represented by the dot-dashed line, can be specified. A value less than this value (and therefore an increased sensitivity) can be selected when the requirement for protection against improper triggering at high road speeds ($v_e > v_2$) can be combatted by raising the triggering threshold in this high speed range, as indicated in FIG. 2 by the dot-dashed line.

By varying the triggering readiness or the triggering threshold according to the invention, based on the intrinsic speed $v_e$, collision objects that are at rest or are moving at a low speed can be correctly evaluated. Thus, it is sufficient to limit object detection 5 to the detection of objects in traffic such as motor vehicles or motorcycles that are not at rest. Sensing that covers the entire front area continuously, even smaller collision objects at rest such as trees or posts, can be eliminated as well. In this way, object detection regarding sensing of collision objects can be made less sensitive and more concentrated in space, as is already implemented by the narrow sensing areas 7.1 and 7.2 in FIG. 1.

Smaller collision objects that appear at the edge of the sensing area of a measuring device, which otherwise would lead to an improper measurement of the lengthwise relative speed, are not picked up by the measuring devices, but are automatically correctly evaluated with the intrinsic speed set in advance. Since only relatively large collision objects which have a relatively high signal amplitude need to be detected, the system sensitivity can be reduced, which in turn results in a lower rate of false alarms and thus to greater system security. In addition, the relevant signals reflected from collision objects can be better distinguished from the ground echo that is always present.

As an extension of the proposition that it is sufficient to recognize reliably only moving collision objects such as vehicles or motorcycles, object detection unit 5 shown in FIG. 1 can be further simplified with two Doppler-radar measuring devices 5.1, 5.2. If one considers that as a statistical average, based on the rules of the road that apply, the objects in traffic that are not at rest appear predominantly on the driver's side, consideration can be given to making measuring device 5.2 on the passenger side simpler, or eliminating it entirely. A remaining measuring device 5.1 then picks up collision objects on the driver's side and measures their relative speeds $v_r$ that approach the lengthwise relative speed $v_{lr}$ of interest, provided the narrow sensing range 7.1 is maintained. Eliminating the sensing area 7.2 on the passenger side as a rule does not represent a reduction of safety for dangerous collisions with on-coming vehicles, because such collisions take place either with complete overlap or partial overlap on the driver's side (offset crash), and thus always fall into sensing area 7.1 on the driver's side. For suitable protection against collisions on the passenger side as well, triggering threshold AS in the case of a collision object that is not detected and a low intrinsic speed $v_e$, should not differ excessively from the standard triggering threshold $AS_s$.

In an object detection arrangement with only a single measuring device, consideration can also be given to aligning and/or expanding the sensing range so that it monitors the entire front area; in other words the driver's side and the passenger side. In particular, a single measuring device mounted on the driver's side or centrally can be provided with an expanded sensing range. An expansion of the sensing range, however, means that deviations in the measured relative speed $v_r$ from the lengthwise relative speed $v_{lr}$ of interest can be greater, especially for collision objects approaching off-center.

In general, the triggering device according to the invention offers the following advantages regarding the evaluation of crash events over known triggering devices with standard triggering thresholds: the case of a crash with a detected collision object is processed better because the triggering threshold can be adjusted to the actual relative speed, which results in significant improvements especially at high and low relative speeds. Likewise the case of a crash with an undetected collision object at rest is processed better because the triggering threshold, because of its dependence on the intrinsic speed, is adjusted so that the triggering control device is always optimally prepared for an impact with a collision object at rest. In particular, any improvement is achieved by lowering the threshold at low relative speeds or intrinsic speeds, by reliably avoiding unnecessary triggering.

In another improvement, collision evaluation unit 11 can be provided which, when the collision object has been detected, compares the measured relative speed $v_{lr}$ with the intrinsic speed $v_e$ and thus determines the direction of motion of the collision object. By performing a comparison, a determination can be made as to whether the collision object detected is at rest, approaching vehicle 1, or moving away from it. In Doppler-radar measuring devices which permit evaluation on the basis of the sign, a further distinction can be made as to whether the vehicle ahead is moving more slowly and therefore a collision is likely to occur, or whether the vehicle ahead is driving faster and therefore poses no danger. Collision evaluation unit 11 detects and evaluates an impending or unavoidable collision with a collision object and controls one or more pre-crash safety devices 12 depending on the evaluation. Suitable pre-crash safety devices 12 are known from the prior art recited at the outset. In particular the following can be provided: a) activation of acoustic or optical warning devices to warn the driver of the colliding vehicle, b) initiation of automatic collision avoidance intervention measures, c) triggering of reversible protection systems such as reversible belt tighteners, or d) adjusting the curve of the vehicle front assembly with a adjustable curve. Since collision evaluation unit 11 evaluates the two signals $v_r$ and $v_{lr}$, it is advantageous to integrate collision evaluation unit 11 into collision parameter detection unit 4, especially in signal generator 8.

In another advantageous embodiment, the intrinsic speed $v_e$ is fed into object detection 5. This permits a system test of object detection, especially of the Doppler-radar measuring devices 5.1, 5.2 by comparing the intrinsic speed $v_e$ with a relative speed determined by measuring technology by means of measuring devices 5.1, 5.2 with respect to a test object at rest. The test object can be a test wall or can be formed by the road, with the ground echo thrown back by the road being evaluated. In a system test, for example, a test can be performed to determine whether a change in the intrinsic speed $v_e$ is reflected at least qualitatively in a corresponding shift of the characteristic power spectrum of the ground echo.

Evaluation of the ground echo offers the advantage that the functional ability and calibration of measuring devices 5.1, 5.2 can be continuously tested and/or corrected during driving. For this purpose, it is advantageous for the antenna characteristics of the Doppler-radar measuring devices 5.1 and 5.2 to have a side lobe pointing in the direction of the road, so that a clear ground echo can be received. More details about the nature and evaluation of the ground echo can be found in German patent document DE 44 29 419 A1 mentioned above. In this document, the ground echo is used to determine the state of the road, with the intrinsic speed $v_e$ being used to form a power spectrum that depends on the Doppler frequency. Advantageously, the ground echo can be used both for a system test and for determining the state of the road. In this embodiment, it is advantageous to integrate object detection 5 with the signal generator 8 in a common housing. Since both electronic units 5, 8 require the intrinsic speed $v_e$ as an input signal. It is also possible to integrate the collision parameter detection unit 4 with all of its components into an assembly with triggering control device 2, especially in a common housing.

If a function problem with object detection unit 5 is detected by a system test, for example by specifying a corresponding value for $v_{lr}$, a collision parameter signal S is specified which sets the triggering threshold AS to the standard triggering threshold $AS_s$.

The triggering devices described, in which the collision parameter signal S influences the triggering readiness, can also be improved significantly by providing that the collision parameter signal S influences not only the triggering decision but also the triggering behavior following a triggering decision. In particular, a choice can be made between the various occupant restraint systems 3. The incorporation of the collision parameter signal S permits a better estimate of the seriousness of the accident and thus an appropriate reaction. In addition to the collision speed, directional information possibly obtained with object detection unit 5 can be used to incorporate the collision object. If an airbag is provided with a multistage gas generator among the occupant restraint systems 3, its triggering behavior, especially the decision as to whether one or two stages should be triggered and/or the points in time for triggering the gas generators, can be influenced by the collision parameter signal S as well.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A device for triggering an occupant protection system in a vehicle for protection of vehicle occupants in a collision, comprising:

a vehicle acceleration detector;

means for generating a delay signal as a function of vehicle acceleration determined by said vehicle acceleration determined by said vehicle acceleration detector;

a triggering control device which having a triggering threshold, for triggering at least said occupant protection system in response to said delay signal exceeding said triggering threshold; and a collision parameter detection unit which includes:

an object detection unit which can detect a collision object in an area near the vehicle, and can determine at least a relative speed between the collision object and the vehicle;

a signal generator which can be controlled by the object detection unit and which, whenever a collision object is detected, specifies a collision parameter signal that depends on determined relative speed; and means for adjusting the triggering threshold of the triggering control device as a function of said collision parameter signal.

2. Triggering device according to claim 1 wherein said collision parameter detection unit further comprises means which, whenever a collision object is detected, control the collision parameter signal to cause the triggering threshold to decrease with increasing determined relative speed, at least in a lower range for the relative speed.

3. Triggering device according to claim 1 wherein the delay signal is prepared from an acceleration signal representing the lengthwise acceleration of the vehicle;

the relative speed determined by the object detection unit is lengthwise relative speed;

the collision parameter detection unit also includes means for detecting intrinsic speed of the vehicle; and, whenever no collision object is detected, the signal generator specifies a collision parameter signal influenced by the intrinsic speed to adjust the triggering threshold.

4. Triggering device according to claim 3 wherein the collision parameter detection unit includes means by which, whenever no collision object is detected, the collision parameter signal causes triggering threshold to decrease with increasing intrinsic speed, at least in a lower range for vehicle intrinsic speed.

5. Triggering device according to claim 2 wherein the collision parameter detection unit includes means by which the triggering readiness is controlled by influencing a triggering threshold, with an increase in triggering readiness being performed by lowering the triggering threshold.

6. Triggering device according to claim 5 wherein the collision parameter detection unit includes means by which:

with a triggering threshold influenced by lengthwise relative speed, the triggering threshold decreases with increasing relative speed, at least in a lower speed range, monotonically with increasing relative speed; and at a triggering threshold influenced by the intrinsic speed, the triggering threshold decreases with increasing vehicle intrinsic speed at least in a lower speed range, monotonically with increasing intrinsic speed.

7. Triggering device according to claim 6 wherein the collision parameter detection unit includes means by which the triggering threshold is raised relative to a standard triggering threshold when no collision object is detected and the vehicle intrinsic speed, or when a collision object is detected, the lengthwise relative speed, lies in a lower speed range, below a first speed value.

8. Triggering device according to claim 6 wherein the collision parameter detection unit includes means by which the triggering threshold is lowered or remains unchanged with respect to the standard triggering threshold, when, with a collision object detected, lengthwise relative speed lies in an upper speed range, above a second speed value.

9. Triggering device according to claim 6 wherein the collision parameter detection unit includes means by which the triggering threshold is unchanged or increased relative to a standard triggering threshold when, with no collision object detected, the intrinsic speed is above the second speed value.

10. Triggering device according to claim 9 wherein the collision parameter detection unit includes means by which the triggering threshold is unchanged or reduced relative to the standard triggering threshold when, with no collision object detected, the vehicle intrinsic speed lies in a middle speed range, between the first and second speed values.

11. Triggering device according to claim 5 wherein the collision parameter detection unit includes means by which dependence of the triggering threshold on the vehicle intrinsic speed is such that an optimum triggering behavior is obtained with respect to collision objects at rest.

12. Triggering device according to claim 11 wherein the collision parameter detection unit includes means by which the object detection unit detects objects in traffic that are not at rest.

13. Triggering device according to claim 3 wherein the object detection unit includes at least one Doppler-radar measuring device which can detect a penetrating collision object in a sensing range in front of the vehicle and can measure its relative speed.

14. Triggering device according to claim 13 wherein the at least one measuring device has a sensing range in the form of a narrow radar lobe aligned in a lengthwise direction of the vehicle, the main direction of said lobe running parallel to a lengthwise axis of the vehicle on the driver's side of the vehicle.

15. Triggering device according to claim 14 further comprising a second measuring device which has a sensing range in the form of a radar lobe which is also directed in the lengthwise direction of the vehicle, the main direction of said lobe running parallel to the lengthwise axis of the vehicle but on the passenger side of the vehicle.

16. Triggering device according to claim 13 comprising a single measuring device located on the driver's side or centrally, the sensing range of said device being so aligned or expanded that the entire front area can be monitored.

17. Triggering device according to claim 3 further comprising a collision evaluation unit which, when a collision object is detected, compares measured relative speed with vehicle intrinsic speed and determines a direction of motion of the collision object accordingly.

18. Triggering device according to claim 17 wherein the collision evaluation unit includes means for detecting an imminent impact with a collision object, evaluating it, and controlling one or more pre-crash safety devices depending on the evaluation.

19. Triggering device according to claim 18 wherein the collision evaluation unit is integrated into the collision parameter detection unit and the signal generator.

20. Triggering device according to claim 3 wherein said collision parameter detection unit includes means for performing a system test by comparing vehicle intrinsic speed with a relative speed determined by the object detection unit, with respect to a test object at rest.

21. Triggering device according to claim 13 said collision parameter detection unit includes that means for performing a system test with evaluation of vehicle intrinsic speed and a ground echo reflected a road surface.

22. Triggering device according to claim 21 wherein said test means also uses the ground echo to determine road condition.

23. Triggering device according to claim 21 wherein antenna characteristics of the at least one Doppler-radar measuring device include a side lobe pointing in the direction of the road.

24. Triggering device according to claim 20 wherein the object detection unit forms an assembly with the signal generator, including a common housing.

25. Triggering device according to claim 20 wherein the collision parameter detection unit includes means by which a system test indicates a functional problem with the object detection unit, the triggering threshold is set to a standard triggering threshold.

26. Triggering device according to claim 3 wherein the collision parameter detection unit is integrated with all of its components into an assembly with the triggering control device, including a common housing.

27. Triggering device according to claim 1 wherein the collision parameter detection unit includes means by which the collision parameter signal also controls triggering behavior of the triggering control device.

28. Triggering device according to claim 27 wherein the occupant protection system includes an airbag with a multistage gas generator the triggering behavior of said generator, including a decision as to whether ignition should take place in one or two stages and/or the triggering points in time for triggering the gas generators, is influenced by the collision parameter signal.

* * * * *